United States Patent [19]

Ogura et al.

[11] Patent Number: 5,028,102
[45] Date of Patent: Jul. 2, 1991

[54] PARALLEL OPTICAL INFORMATION PROCESSING SYSTEM

[75] Inventors: Yukio Ogura, Yokohama; Toshio Inada, Sagamihara; Hironobu Mifune; Aki Ueda, both of Yokohama, all of Japan

[73] Assignee: Ricoh Company, Ltd., Japan

[21] Appl. No.: 439,862

[22] Filed: Nov. 21, 1989

[30] Foreign Application Priority Data

Nov. 25, 1988 [JP] Japan .................. 63-297451

[51] Int. Cl.$^5$ .................. G03H 1/08; G06K 9/76; G02B 27/46
[52] U.S. Cl. .................. 350/3.62; 350/3.66; 350/3.82; 350/162.12; 350/330; 364/827; 364/822; 364/200; 364/249.5; 365/125; 382/31; 369/103
[58] Field of Search .................. 382/31, 42, 43; 364/822, 249.4, 249.5, 827; 365/215, 216, 125; 350/3.82, 3.68, 3.67, 3.66, 3.64, 3.61, 3.6, 162.14, 162.12, 162.13, 169, 330, 3.62; 369/103

[56] References Cited

U.S. PATENT DOCUMENTS

| | | | |
|---|---|---|---|
| 4,462,046 | 7/1984 | Spight | 350/162.14 |
| 4,655,542 | 4/1987 | Dube | 350/3.64 |
| 4,715,683 | 12/1987 | Gregory et al. | 350/3.66 X |
| 4,832,447 | 5/1989 | Javidi | 350/162.13 |
| 4,837,843 | 6/1989 | Owechko | 382/31 |

OTHER PUBLICATIONS

Lohman, R. D., "An Experimental Holographic Read/Write Optical Memory", Digest of Technical Papers of Topical Meeting on Optical Storage of Digital Data, Aspen, Colo., U.S.A. (19-21 Mar. 1973), 4 pp.

*Primary Examiner*—Rodney B. Bovernick
*Assistant Examiner*—David R. Parsons
*Attorney, Agent, or Firm*—Mason, Fenwick & Lawrence

[57] ABSTRACT

A parallel optical information processing system includes an information inputting part which produces a coherent optical beam spatially modulated by input image information. A rewritable hologram memory carries a plurality of stored images as holograms so that the holograms are overlapped with each other, the rewritable hologram memory being written with image information when illuminated by a recording optical beam. An image reproducing part is supplied with the input image information, and produces reproduced image information from the rewritable hologram memory. A hologram synthesizing part synthesizes a synthetic hologram in response to the reproduced image information. A hologram recording part records the synthetic hologram in the rewritable hologram memory through the recording optical beam.

14 Claims, 6 Drawing Sheets

PARALLEL OPTICAL INFORMATION PROCESSING SYSTEM

BACKGROUND OF THE INVENTION

The present invention generally relates to parallel processing of information and more particularly to a parallel optical information processing system suitable for character identification, visual image sensing and the like.

As an outcome of demand for a system which is capable of identifying images having predetermined patterns such as numeric or alphabetical characters at a high speed, a parallel optical information system has recently been developed. In this system, an object light forming an input image is projected on a hologram carrying a plurality of Fourier transform images recorded thereon by multiple exposure. When the foregoing object light is incident to such a hologram, an optical output is formed as a result of diffraction such that on of the Fourier images which approximates the incident image with a maximum correlation is reproduced with a maximum intensity. Using such a nature of the hologram, the system performs the identification of the images.

FIG. 1 shows a typical prior art parallel optical information processing system 1. Referring to the drawing, the system 1 comprises an information input subsystem which in turn comprises a laser diode 2 for producing a coherent optical beam along an optical axis, a collimator lens 3 provided on the optical axis for shaping the coherent optical beam from the laser diode 2 into a parallel optical beam, and a spatial modulator 4 also provided on the optical axis for modulating the parallel optical beam from the collimator lens 3. On the optical axis of the optical beam, there is further provided a half-mirror 5 with an angle of 45 degrees with respect to the optical axis, and beyond the half-mirror 5, there are provided a first Fourier transform lens 6 and a Fourier transform hologram 7 acting as a hologram memory. Further, beyond the hologram 7, there are provided a second Fourier transform lens 8 and a pinhole array mirror 9 along an optical path of a diffraction beam produced by the hologram 7. On an optical path of a reflection beam produced by the foregoing half-mirror 5, on the other hand, there is provided a detector 10 which may be a charge-coupled device (CCD) which in turn is connected to an image identification apparatus 13 and further to the foregoing spatial modulator 4 via an amplifier 11 and a threshold device 12. Also, the spatial modulator 4 is coupled to an image input device (not illustrated) having a photo-electric conversion function.

In the foregoing system, an input image to be processed (not illustrated) is first converted to an electrical image by the not-illustrated image input device and is written into the spatial modulator 4. When the parallel coherent optical beam is incident to the spatial modulator 4 from the laser diode 2 via the collimator lens 3, an object light is produced as a result of modulation of the beam by the spatial modulator 4. This object light is then subjected to the Fourier transformation in the first Fourier transform lens 6 and is projected to the Fourier transform hologram 7. The Fourier transform hologram 7 is recorded with a number of Fourier transform hologram images in an overlapped manner by multiple exposure with an angle of the reference light which is changed for each hologram image at the time of recording, and produces a first order diffraction beam which is then focused by the second Fourier transform lens 8 on the pinhole array mirror 9. The first order diffraction beam thus focused is then reflected and returned to the Fourier transform hologram 7 by passing through the lens 8 along a reversed optical path. Thereby, one of the Fourier transform images which has the maximum correlation to the incident image is reproduced with maximum intensity. This reproduced Fourier transform image is then detected by the CCD device 10 and is converted to an electrical signal. This electrical signal is then supplied to the apparatus 13 for image identification after amplification and suitable correction in the amplifier 11 and the threshold device 12. In a case when the identification in the apparatus 13 turned to be difficult, an output of the apparatus 13 carrying the reproduced image is supplied again to the spatial modulator 4 and the foregoing procedure is repeated.

In the prior art parallel optical information processing system as described, there is an advantage in that a complete image can be reproduced from an incomplete image. Further, such a system can be used as an associative memory.

Presently, such a parallel optical information processing system is required to perform various functions, and associated therewith, it is strongly desired that the Fourier transform hologram 7 used in the system is rewritable. Conventionally, the Fourier transform hologram 7 has been recorded with the hologram images as a result of interference between an object light carrying the Fourier transform images and a reference light while changing the angle of the reference light for each of the Fourier transform images. For such a purpose, a complex mechanism is needed and the rewriting of the hologram image has been difficult. Further, storing of many informations in one hologram is difficult as the recording of the Fourier transform image is made by the multiple exposure of the interference patterns. When the number of the overlapped Fourier transform holograms is increased, the entire hologram becomes dark and the separation of the individual diffraction beams becomes difficult. Because of this reason, the number of the Fourier transform images that can be held in one hologram has been limited to five or six in the maximum. Further, as a consequence that the prior art parallel optical processing system processes the images of bodies directly, further increase of the information to be processed by the system is difficult.

SUMMARY OF THE INVENTION

Accordingly, it is a general object of the present invention to provide a novel and useful parallel optical information processing system wherein the foregoing problems are eliminated.

Another object of the present invention is to provide a parallel optical information processing system wherein a spatially modulated coherent optical beam is produced by information inputting means responsive to an input image information and the coherent optical beam thus produced is supplied to a rewritable hologram memory storing a number of image informations in an overlapped state in a form of hologram. Thereby, an image which approximates the input image information with a maximum correlation is reproduced from the hologram memory and this reproduced image is read by reading means which produces an electrical output representing the reproduced image. Further, a hologram image corresponding to the reproduced image is synthesized by hologram synthesizing means as a computer hologram on the basis of the output of the reading means and the computer hologram thus synthesized is written into the hologram memory by hologram writing means. According to the present invention, the parallel optical information processing system has flexibility in that the content of the hologram memory can be rewritten freely by the hologram synthesizing means responsive to the reproduced image and the applicability of the system is significantly expanded. Further, the process of writing the synthetic hologram is easily performed by the hologram writing means which may be a processor performing synthesis of images by computer graphics and the construction of the system can be simplified over the prior art system. Note that the writing of the hologram has conventionally been made by interfering the object light and the reference light while changing the angle of the reference light. Further, such a synthetic hologram can be recorded by finely focused optical beam with increased information density as compared to the conventional hologram which is formed as a result of the interference.

Another object of the present invention is to provide a parallel optical information processing means wherein a number of spatially modulated coherent optical beams each carrying input image information are produced by image inputting means in a row and column formation and the coherent optical beams thus produced are supplied to a rewritable hologram memory which stores a number of image information in a form of hologram such that the stored information are arranged in a row and column formation in the hologram memory. Thereby, an image approximating the input image information with a maximum correlation is reproduced from the hologram memory and this reproduced image is read by reading means which produces an electrical output representing the reproduced image. Further, a hologram of the reproduced image is synthesized by hologram synthesizing means as a computer hologram responsive to the output of the reading means and the synthesized computer holograms are written into the hologram memory in a row and column formation by hologram writing means. According to the present invention, the amount of the information to be processed by the system can be increased significantly by dividing the rewritable hologram memory into a number of regions arranged in the row and column formation each storing a number of holograms in an overlapped manner.

Another object of the present invention is to provide a parallel optical information processing system wherein a number of spatially modulated coherent beams are produced in a row and column formation by information inputting means responsive to an inputted coded information, and the coherent optical beams are projected to a rewritable hologram memory storing a number of coded information in a form of hologram in a row and column formation. Thereby, an image approximating the inputted coded information with a maximum correlation is reproduced from the hologram memory and the reproduced image is read by reading means. The reading means produces an electrical output representing the reproduced image and a hologram is synthesized by hologram synthesizing means on the basis of the output of the reading means. Further, the synthesized hologram is written into the hologram memory by hologram writing means in a row and column formation. According to the present invention, the information to be processed by the system is further increased by coding the input information in combination with the division of the hologram memory into a number of regions arranged in the row and column formation.

DETAILED DESCRIPTION

Figure 2:
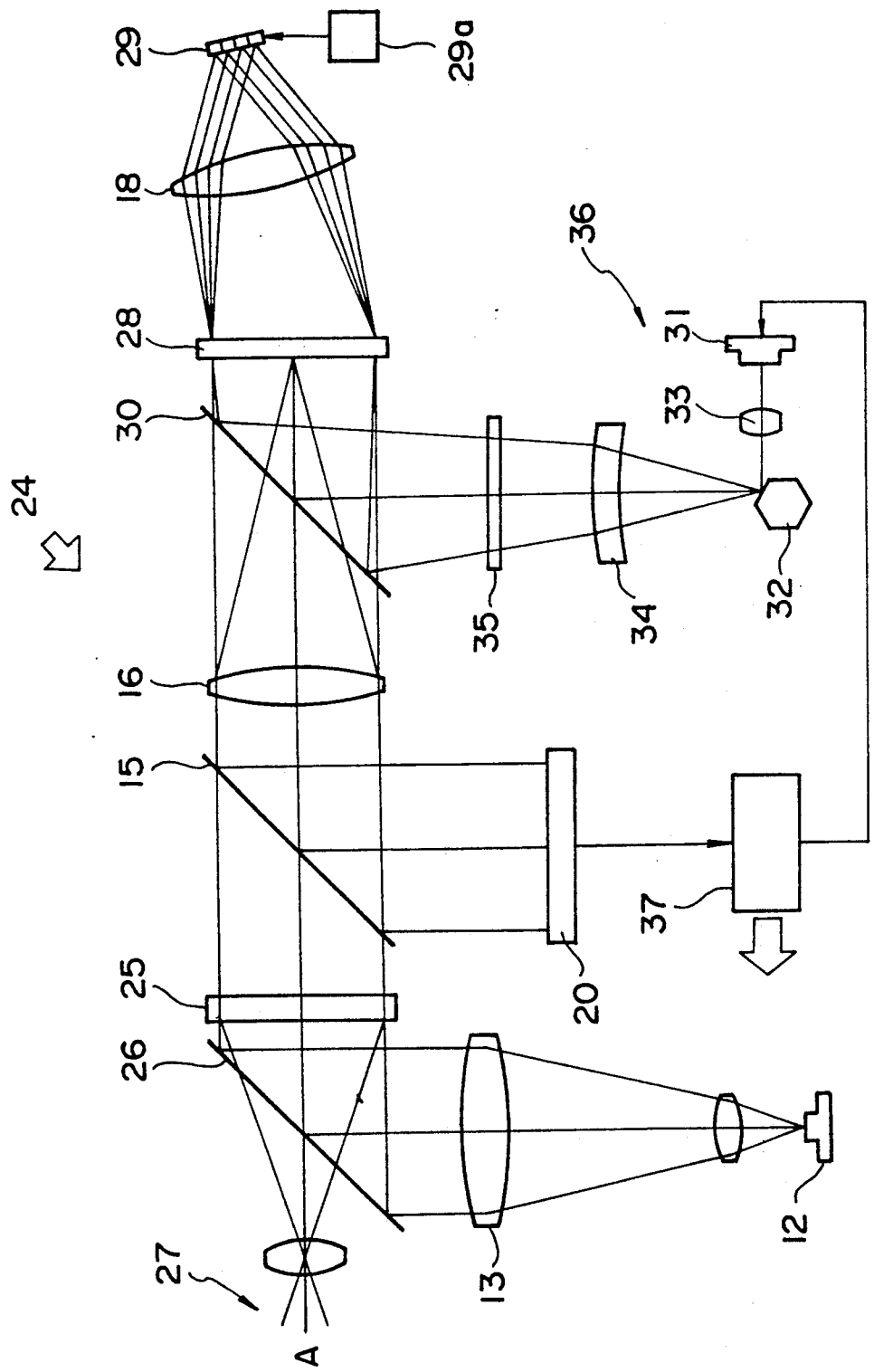
FIG. 2 is a diagram showing a construction of the parallel optical processing system according to an embodiment of the present invention.

FIG. 2 shows a first embodiment of the parallel optical processing system according to the present invention.

Referring to the drawing, a coherent optical beam is produced by a laser diode 12 and is shaped into a parallel optical beam by a collimator lens 13. The parallel optical beam thus produced is incident to a half-mirror 26 provided with an angle of 45 degrees with respect to an optical path of the parallel optical beam and is deflected by 90 degrees to a spatial modulator 25.

The spatial modulator 25 is written or recorded with an input image of an object such as a letter "A" as illustrated through a lens 27 and the half-mirror 26. The spatial modulator 25 may be a liquid crystal light valve or a BSO (bismuth silicon oxide) device and records the input image in a form of transparent and opaque patterns. Thus, when the spatial modulator 25 is illuminated by the parallel coherent optical beam from the lens 13, the optical beam is modulated and a spatially modulated coherent optical beam is produced. This coherent optical beam is then passed through a Fourier transform lens 16 and is focused on a hologram memory 28 in a form of a Fourier transformed image. The hologram memory 28 may be a liquid crystal light valve or BSO device similar to the spatial modulator 25 and is written with a number of Fourier transform hologram images in a form of opaque and transparent patterns.

After the hologram memory 28, there is provided another Fourier transform lens 18 separated from the hologram memory 28 by a distance equal to the focal length of the lens 18, and further behind, there is provided a reflective type laser diode array 29 at the focal plane of the lens 18. In the laser diode array 29, a number of laser diodes are arranged in a row and column formation and each of the laser diodes is coupled to a photodetector which is arranged also in the row and column formation. Note that the photodetectors and the laser diodes are directed to a same direction. Thus, when an optical beam is incident to one of the photodetectors, the laser diode coupled to that photodetector is energized and produces a laser beam in a direction opposite to the path of the incident optical beam. In other words, the laser diode array "reflects" the incident optical beam with amplification. Further, the laser diode array 29 may have a controller 29a having a threshold function for controlling the laser diodes in the array such that only the laser diode that is coupled to a photodetector which has detected the strongest incident optical beam is energized.

Further, there is provided another half-mirror 30 between the Fourier transform lens 16 and the hologram memory 28 with an angle of 45 degrees with respect to the optical path, and a laser scanning part 36 is provided so as to confront to the half-mirror 30. The laser scanner 36 may comprise a laser diode 31 and a rotary polygonal mirror 32 for deflecting an optical beam produced by the laser diode 31, whereby the optical beam from the laser diode 31 is directed to the hologram memory 28 after reflection at the half-mirror 30. Further, there are provided various lenses 33–35 forming an optical system for shaping the optical beam. The laser diode 31 of the laser scanner 36 is driven by a digital processor 37 which is connected to a CCD detector 20 which in turn receives an output image or processed image from the hologram memory 28 via the lens 16 and a half-mirror 15 provided between the spatial modulator 25 and the lens 16.

When the spatially modulated coherent optical beam is incident to the hologram memory 28 after Fourier transform in the lens 16, there are produced a number of first order diffraction beams representing the correlation between the Fourier transform of the inputted image and the Fourier transform hologram images stored in the hologram memory with respective intensities and diffraction angles as is well known. Such first order diffraction beams are focused on respective photodetectors in the laser diode array 29. In the laser diode array 29, one of the laser diodes which is coupled to the photodiode that has detected the diffraction beam having the maximum intensity is selectively energized and the hologram memory 28 is irradiated by the laser beam produced by this laser diode via the lens 18. Responsive thereto, the Fourier image of the body or object which is the closest to the input image is reproduced from the hologram memory 28 and is supplied to the CCD detector 20 after Fourier inverse-transformation in the lens 16 and reflection by the half-mirror 15.

Responsive to the input of the reproduced image supplied thereto, the CCD detector 20, which may comprise a two dimensional CCD array, produces an electric output indicative of the reproduced image and this reproduced image is supplied to the digital processor 37 forming the laser scanning part 36. This processor 37 stores a program for performing a computer graphic hologram known as CGH and synthesizes a hologram of the image supplied thereto digitally from the CCD detector 20 according to a well known equation $$I(x,y) = | U_R e^{j\beta x} + U_S e^{j\alpha} |^2$$

where I(x,y) represents the synethtic hologram pattern, $U_S$ is the Fourier transform of the reproduced image, $U_R$ is the amplitude of the reference light, and $\beta = (2\pi/\lambda).\sin\sigma$ in which $\sigma$ is the angle of the reference light.

The synthesized hologram is obtained from the processor 37 as a drive signal of the laser diode 31 and responsive to the energization of the laser diode by the drive signal, the synthetic Fourier transform hologram is written into the hologram memory 28 by the laser beam after the controlled deflection by the rotating polygonal mirror 32 and the deflection by the half-mirror 30. Similarly, the writing of image information into the spatial modulator 25 may be made by a writing apparatus (not shown) similar to the laser scanning apparatus 36.

According to the foregoing construction, the parallel optical processing system performs with flexibility and can respond to various image information searching activities. For example, it is possible to modify the searched image by the processor 37 and update the hologram memory 28 by the modified image or store the modified image in addition to the already stored images. As a result of use of liquid crystal light valve for the hologram memory 28, the number of times the hologram memory can be updated is increased and the system of the present invention is suited for practical use.

Figure 3:
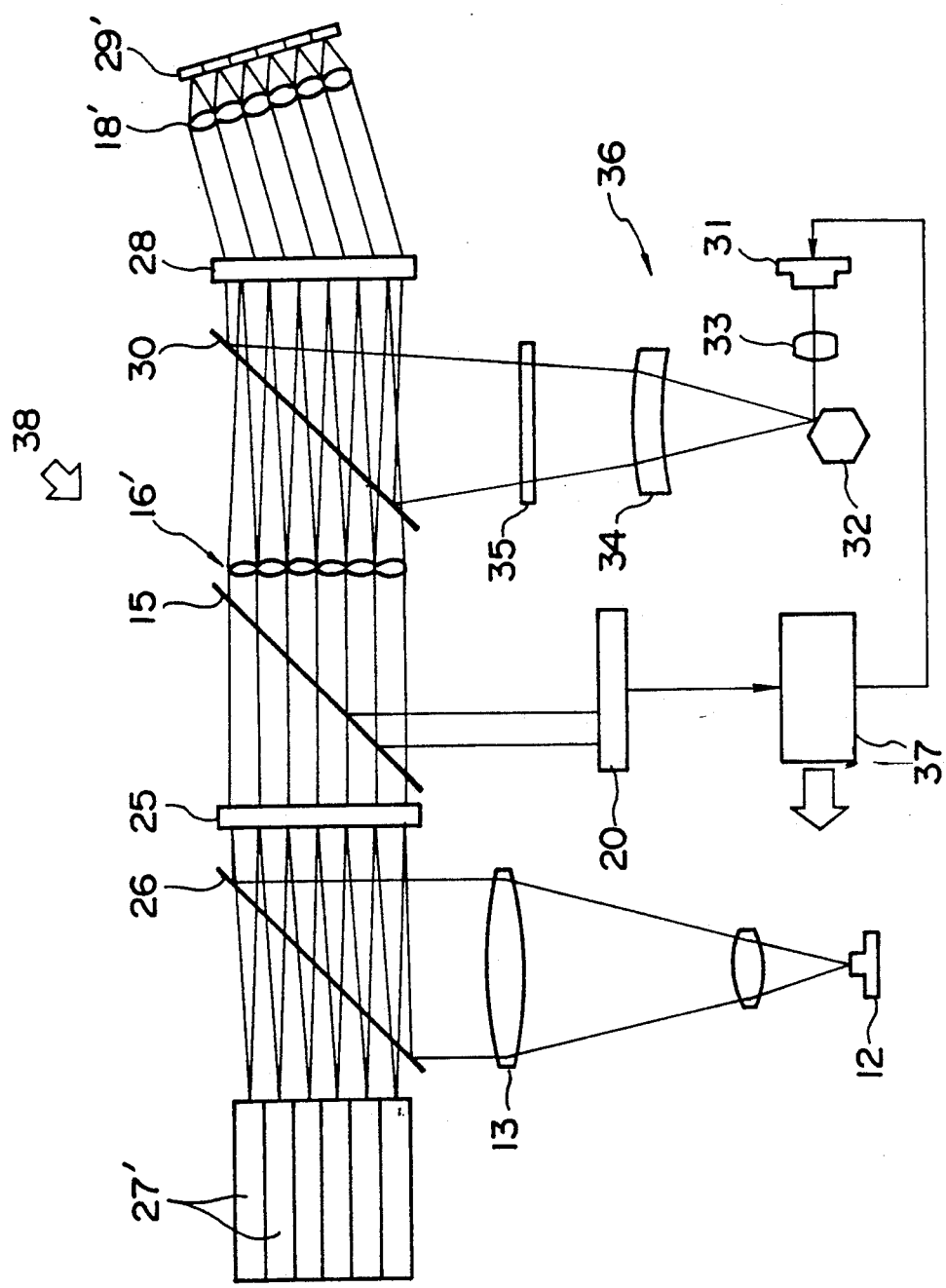
FIG. 3 is a diagram showing a construction of the parallel optical processing system according to a second embodiment of the present invention.

Next, an parallel optical information processing system 38 according to a second embodiment of the present invention will be described with reference to FIG. 3. In the description hereinafter, these parts constructed and operating identically to the parts already described with reference to FIG. 2 will be given identical reference numerals and the description thereof will be omitted.

Referring to the drawing, the system 38 has an image inputting part 27' which is divided into a number of parts such as lenses each corresponding to the lens 27 of FIG. 2 arranged in a row and column formation. Responsive to such a row and column formation of the image inputting part 27', input images are written in the spatial modulator 25 in a row and column formation corresponding to the row and column formation of the image inputting part 27'. Alternatively, the image inputting part 27' may comprise a row and column formation of image forming devices for forming images responsive to external signals.

In correspondence to the row and column formation of the images written in the spatial modulator 25, the hologram memory 28 is recorded with a number of Fourier transform holograms in a row and column formation and the laser scanning part 36 writes the Fourier transform hologram also in the row and column formation.

Further, in correspondence to the foregoing row and column formation of the images recorded in the spatial modulator 25 and in the hologram memory 28, a lens array 16' comprising a number of Fourier transform lenses arranged in a row and column formation each corresponding to the Fourier transform lens 16 of FIG. 2 is provided between the half-mirror 15 and the half-mirror 30. Similarly, another lens array 18' comprising a number of Fourier transform lenses arranged in a row and column formation and each corresponding to the Fourier transform lens 18 of FIG. 2 is provided behind the hologram memory 28. Further, a laser diode array 29' is provided further behind the lens array 18' such that the each of the elements of the laser diode array 29' comprises the laser diode array 29 of FIG. 2. Other construction of the system is identical to the system of FIG. 2.

In operation, a same input image information is written in the spatial modulator 25 in a plurality of regions arranged in the foregoing row and column formation. As a result, a number of spatially modulated coherent optical beams are produced in a row and column formation from the spatial modulator 25 responsive to the irradiation of the optical beam from the laser diode 12. These modulated coherent optical beams are respectively subjected to Fourier transformation in a Fourier transform lens array 29' and are incident to the hologram memory 28.

In the hologram memory 28, a number of Fourier transform holograms of various objects are recorded in a number of regions arranged in a row and column formation in correspondence to the row and column formation of the incident optical beams and in each of the regions, there are recorded a plurality of holograms in a overlapped state. When such a hologram memory is illuminated by the plurality of the modulated coherent optical beams each carrying a Fourier transform image of a same input image, there are produced a number of first order diffraction beams with respective diffraction angles and intensities indicating the degree of correlation between the body image stored in the hologram memory and the input image. These diffraction beams are detected by the laser diode array 29' and responsive thereto, the laser diode array 29' produces an optical beam in correspondence to the diffraction beam having the maximum intensity. This optical beam is traveled along a reversed path of the diffraction beam and reaches the hologram memory 28. Thereafter, a procedure described with reference to FIG. 2 is repeated.

According to this embodiment, the number of image informations stored in the hologram memory can be increased significantly as compared to the case of the system of FIG. 2 where the Fourier transform holograms are recorded by the multiple exposure or multiple writing of the computer graphic hologram on the entire area of the hologram memory 28.

Figure 4:
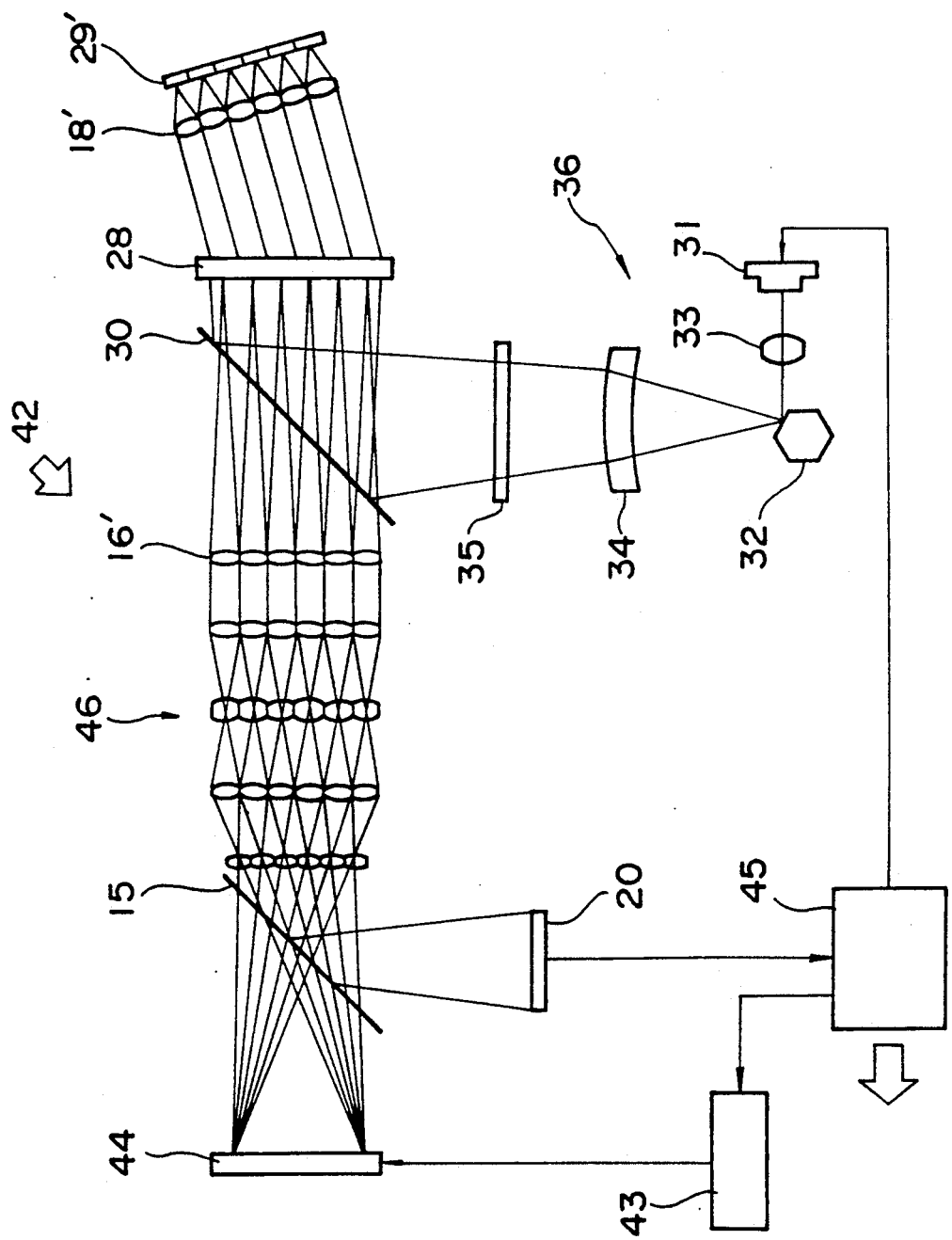
FIG. 4 is a diagram showing a construction of the parallel optical processing system according to a third embodiment of the present invention.

Next, a parallel optical processing system 42 according to a third embodiment of the present invention will be described with reference to FIG. 4. In the drawing, these parts constructed and operating identically to the parts already described with reference to the preceding drawings are given identical reference numerals and the description thereof will be omitted.

In the system 42, there is provided an encoding part 43 for coding an input information to form a coded output and this coded output is supplied to a laser diode array 44 confronting the half-mirror 15. The laser diode array 44 produces a coded optical pattern responsive to the coded output and this coded optical pattern is projected to the hologram memory 28 in a form of a bundle of coherent optical beams arranged in a row and column formation through the half-mirror 15, a lens system 46 carrying a number of lens arrays each arranged in row and column formation in correspondence to the coherent optical beams, the Fourier transform lens array 16' and the half-mirror 30. Further, there is provided a processor 45 coupled to the CCD detector 20 and further to the foregoing coding part 43. In contrast the the processor 37 for the previous embodiments, the processor 45 performs a synthesis of computer graphic hologram corresponding the coded image and further has a function for decoding the reproduced coded image detected by the CCD device 20. Other construction of the system is identical to the system of FIG. 3.

In operation, the input image to the encoding part 43 is coded and the foregoing bundle of coherent optical beams are produced by the laser diode array 44 according to the coded output as already described. When these optical beams are incident to the hologram memory 28 carrying a number of synthetic Fourier transform holograms of coded images arranged in row and column formation, the Fourier transform image of the coded image which has the maximum correlation with the coded image stored in the memory 28 in the form of Fourier transform hologram is selectively reproduced and detected by the CCD detector 20 after inverse Fourier transformation in the lens array 16' similarly to the foregoing embodiments.

When the reproduced coded image is detected by the detector 20, this coded image is decoded in the processor 45 and conversion or correction of the decoded image is performed in the processor 45. The processor 45 further produces a coded output of this converted or corrected image and supplies the coded output to laser diode array 44 via the encoding part 43. Further, the processor 45 synthesizes the computer graphic hologram of such a converted or corrected coded image and writes the synthetic hologram thus produced on the hologram memory via the laser scanning part 36. As a result of the recording of the images in a coded form, further increase of the informations processed by the system is achieved.

Figure 5:
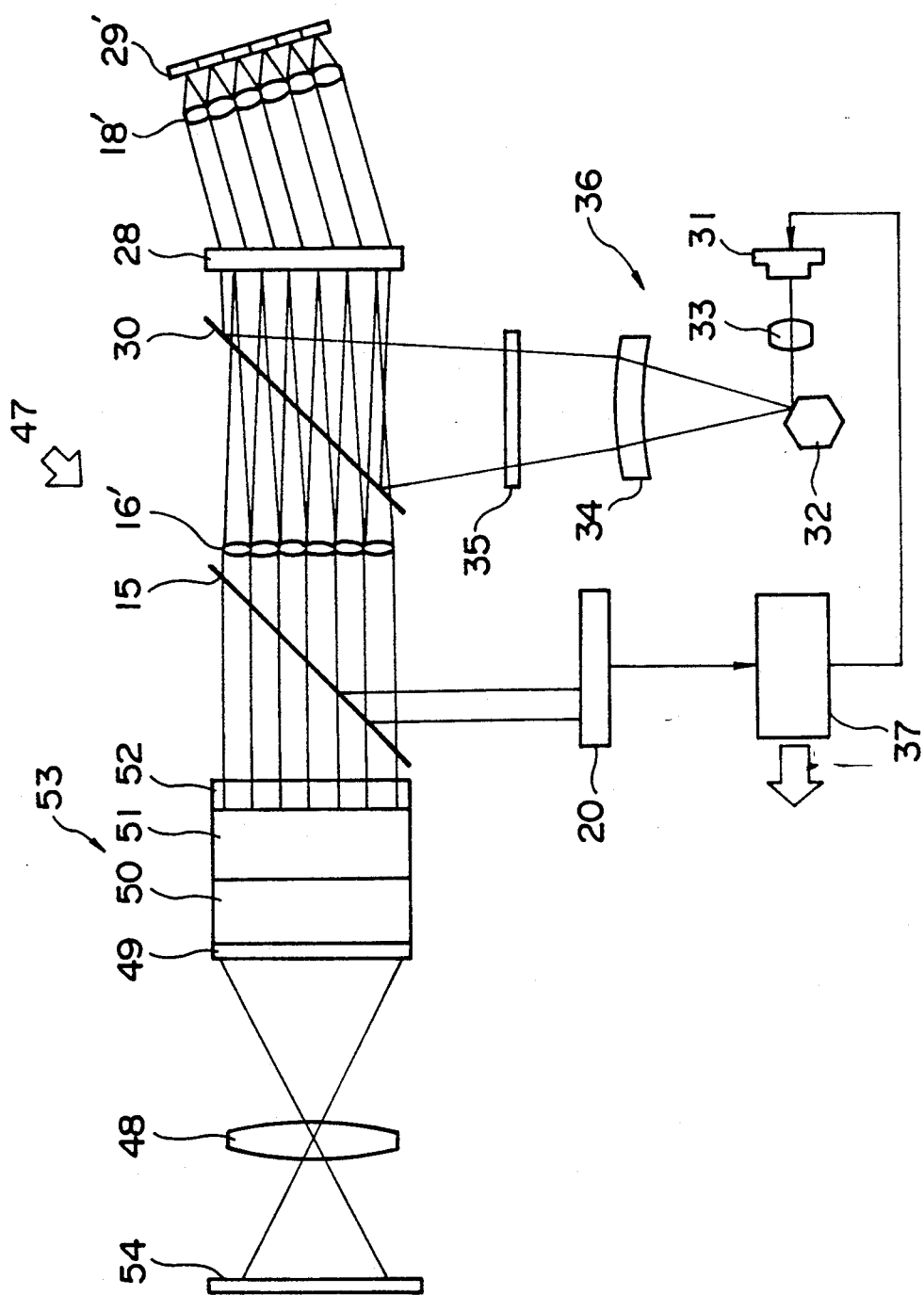
FIG. 5 is a diagram showing a construction of the parallel optical processing system according to a fourth embodiment of the present invention.

Next, a parallel optical information processing system 47 according to a fourth embodiment of the present invention will be described with reference to FIG. 5. In the drawing, these parts which are constructed identically and operates identically to the parts already described with reference to the preceding drawings are given identical reference numerals and the description thereof will be omitted.

In this embodiment, there is provided a lens 48 for receiving an input image 54 and the image 54 is focused on a matrix-type photodetection part 49 carrying a number of photodetectors arranged in row and column formation. Further, a feature extraction part 50 is connected to the photodetection part 49 and an encoder 51 is further connected to the feature extraction part 50. Furthermore, a laser diode array 52 is connected to the encoder 51. The photodetection part 49, feature extraction part 50, encoder 51 and the laser diode array 52 form an image inputting part 53. The image inputting part 53 is provided such that the optical beam produced by the laser diode array are incident to the hologram memory via the half-mirror 15 to the hologram memory 28. Other construction of the system is identical to the system of FIG. 3.

Figure 1:
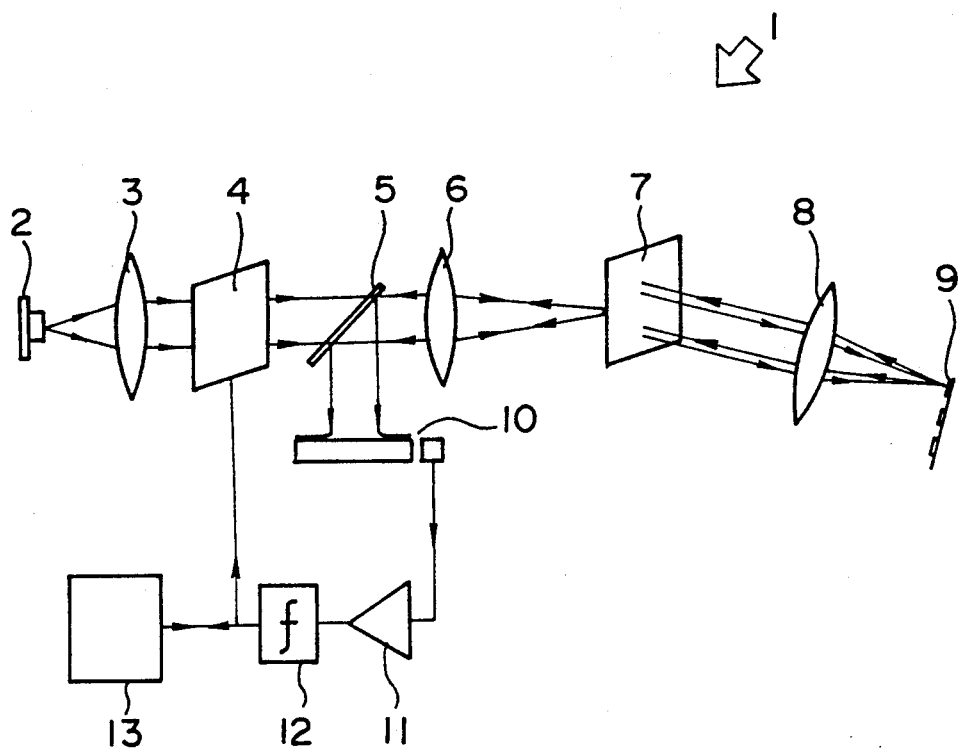
FIG. 1 is a diagram showing a construction of a prior art parallel optical processing system.
Figure 6:
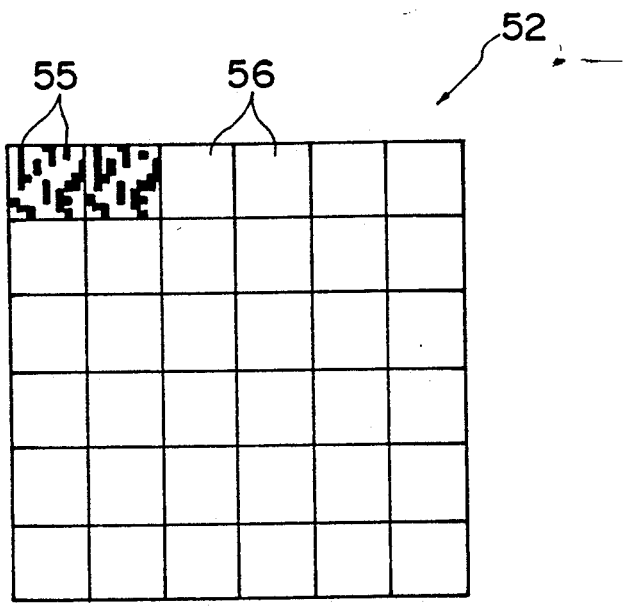
FIG. 6 is a front view showing a laser diode array used in the system of FIG. 5.

In this system, the input image 54 is once converted to electrical signal when it is focused on the photodetection part 49. After the conversion, the electrical signal is processed in the feature extraction part 50 whereby edge detection, slope detection, curvature detection, line-connection pattern detection and the like are performed electrically. The output of the feature extraction part 50 representing these features is then supplied to the encoder 51 and responsive to the output of the encoder 51, an output pattern as shown in FIG. 6 is produced by the laser diode array 52. Note that the laser diode array 52 comprises a laser diode subarray 56 arranged in row and column formation each comprising a number of laser diodes 55 arranged in row and column formation. In each of the subarrays 56, a same coded image is formed. Alternatively, the image inputting part may be constructed that a single coded image is optically divided into a number of images by using a lens array such as the lens array 46 shown in FIG. 4.

Example of the feature extraction part is described in our co-pending U.S. patent application Ser. Nos. 367,756 and 374,296. Hereinafter, only a brief description will be given on the image inputting part 53 with reference to FIG. 7.

Figure 7:
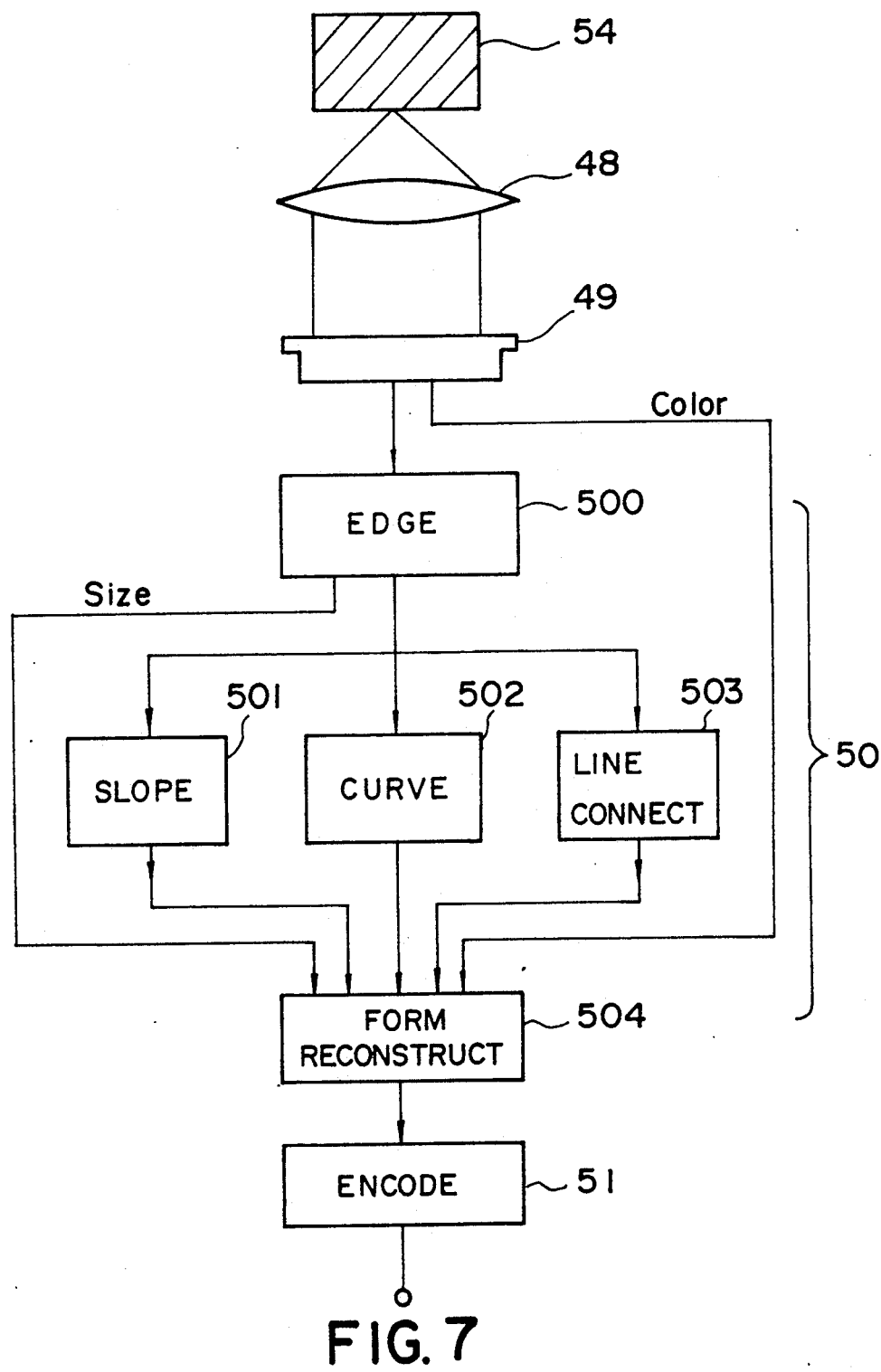
FIG. 7 is a block diagram showing a part of the system of FIG. 5.

Referring to FIG. 7, the input image 54 is received by a photodetector array 49 which produces an electrical output signal to be supplied to an edge detection part 500. The edge detection part 500 detects the edge of the input image as an edge image by a spatial differentiation of the image. The edge image is then supplied to a slope detecting part 501, a curvature detecting part 502 and a line connection pattern detecting part 503 simultaneously. The parts 501, 502 and 503 may be a mask for selectively passing a line having a predetermined slope, curvature and the line connection pattern and may be constructed optically or electronically.

Output signals from the slope detecting part 501, curvature detecting part 502 and the line connection part 503 are supplied to a basic form reconstruction part 504 together with a color signal indicating the color of the object from the photodetector array 49 as well as a size signal indicating the size of the object from the edge detection part 500. In the basic form reconstruction part 504, these output signals are arranged in a predetermined format and on the basis of this format, the coded input image is produced in the encoding circuit 51. The coded input image is then supplied to the laser diode array 52 as already described.

Further, the present invention is not limited to these embodiments described heretofore but various variations and modifications may be made without departing from the scope of the invention.

What is claimed is:

1. A parallel optical information processing system, comprising:
   information inputting means, supplied with input image information of an object, for producing a coherent first optical beam that is spatially modulated by the input image information;
   a rewritable hologram memory means for storing image information of one or more objects as a hologram, the rewritable hologram memory means being written with a hologram of new image information when irradiated by a recording optical beam, the rewritable hologram memory means being provided to be irradiated by the first optical beam and producing a coherent, second optical beam representing a correlation between the input image information and the image information of the object stored in the hologram memory means;
   image reproducing means, supplied with second optical beam from the hologram memory means, for producing a coherent third optical beam that represents the image information of an object that is stored in the hologram memory means and has a maximum correlation with the input image information;
   hologram synthesizing means, supplied with the third optical beam from the image reproducing means, for synthesizing a synthetic hologram therefrom; and
   hologram recording means, supplied with the synthetic hologram from the hologram synthesizing means, for recording the synthetic hologram on the rewritable hologram memory means by producing a fourth optical beam in response to the synthetic hologram as the recording optical beam.

2. The parallel optical information processing system of claim 1, wherein the information inputting means includes:
   a spatial modulator recorded with the input image in the form of transparent and opaque patterns;
   a laser diode for producing an optical beam; and
   an optical system for guiding the optical beam so that the optical beam is passed through the spatial modulator as the first optical base.

3. The parallel optical information processing system of claim 1 wherein:
   the rewritable hologram memory means includes a liquid crystal light valve and stores the image information in the form of a Fourier transform hologram.

4. The parallel optical information processing system of claim 1, wherein:
   (1) the rewritable hologram memory means includes:
      (a) a hologram recording part for recording the hologram in the form of transparent and opaque patterns; and
      (b) a first focusing means provided at a first side of the hologram recording part close to the information inputting means for focusing the first optical beam into the hologram recording part so as to form a Fourier transform of the input image information thereon; and
      (c) a second focusing means disposed at the second side of the hologram recording part away from the first focusing means for focusing the second optical beam produced by the hologram in the hologram recording part upon irradiation of the first optical beam thereon as a diffracted optical beam, on a focal plane of the second focusing means; and
   (2) the image reproducing means includes:
      (a) a laser diode/photodetector array, provided at the focal plane of the second focusing means, for detecting the second optical beam and for producing a fourth optical beam such that the fourth optical beam travels along a path which is opposite to that of the second optical beam, the laser diode/photodetector array directing the fourth optical beam to the hologram memory means such that the hologram memory means produces the third optical beam in response to the fourth optical beam.

5. The parallel optical information processing system of claim 4, wherein:
   the laser diode/photodetector array includes an array of laser diodes and photodiodes;
   each laser diode is coupled electrically to a corresponding photodiode; and
   each laser diode produces a laser beam substantially coincident to and in a direction opposite to an optical beam that is incident to the corresponding photodiode.

6. The parallel optical information processing system of claim 4, wherein the detection means includes:
   (1) a half-mirror located between
      (a) the information inputting means and
      (b) the first focusing means, for deflecting the third optical beam from the hologram memory after the third optical beam has passed through the first focusing means; and
   (2) a photodetector array for detecting the third optical beam thus deflected by the half-mirror.

7. The parallel optical information processing system of claim 4, wherein:
   the first focusing means includes a first lens; and
   the second focusing means includes a second lens.

8. The parallel optical information processing system of claim 4, wherein:
the first focusing means includes a first lens array; and
the second focusing means includes a second lens array;
wherein each of the first and second lens arrays include a plurality of lenses arranged in a row and column formation.

9. The parallel optical information processing system of claim 8, wherein:
the information input means includes a plurality of input image producing means arranged in a row and column formation in correspondence to the first and second focusing means, for producing a number of coherent optical beams, each carrying the same input image information as the first optical beam.

10. The parallel optical information processing system of claim 8, wherein:
(1) the laser diode/photodetector array comprises an array of laser diodes and photodiodes;
(2) each of the laser diodes is coupled electrically to a corresponding photodiode and provided so that each laser diode produces a laser beam substantially coincident to and travelling in a direction opposition to an optical beam that is incident to the corresponding photodiode;
(3) the laser diodes and photodiodes are arranged in a plurality of subarrays, each subarray corresponding to one of the coherent optical beams forming the first optical beam; and
(4) each of the subarrays includes:
(a) a plurality of laser diodes arranged in a row and column formation; and
(b) corresponding laser photodiodes arranged in a row and column formation.

11. The parallel optical information processing system of claim 1, wherein:
the hologram synthesizing means includes a digital processor for synthesizing a Fourier transform hologram of the reproduced information image supplied thereto digitally.

12. The parallel optical information processing system of claim 11 wherein the hologram recording means includes:
a laser diode, driven by an output signal of the digital processor, for producing an output laser beam as the recording optical beam; and
a polygonal mirror for deflecting the output laser beam of the laser diode so that the laser diode writes the synthetic hologram into the hologram memory means.

13. The parallel optical information processing system of claim 11, wherein the information inputting means includes:
an image encoding means, supplied with an electrical output related to the reproduced image information from the digital processor, for producing an encoded image in response to the output; and
a laser diode array including a plurality of laser diode elements arranged in a row and column formation, each of the laser diode elements being driven by the image encoding means for producing the first optical beam so that the first optical beam is modulated by the encoded image.

14. The parallel optical information processing system of claim 1, wherein the information inputting means includes:
an image encoding means, supplied with the input image information, for producing an output signal representing an encoded image of the input image information electrically; and
a laser diode array including an array of laser diode elements arranged in a row and column formation, each of the laser diode elements being supplied with output signal of the image encoding means for producing the first optical beam modulated according to the coded image.

* * * * *